US 7,596,812 B2

(12) United States Patent
Li et al.

(10) Patent No.: US 7,596,812 B2
(45) Date of Patent: Sep. 29, 2009

(54) SYSTEM AND METHOD FOR PROTECTED DATA TRANSFER

(75) Inventors: Yi Q. Li, Skokie, IL (US); Ezzat A. Dabbish, Cary, IL (US); Morris A. Moore, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 872 days.

(21) Appl. No.: 11/152,216

(22) Filed: Jun. 14, 2005

(65) Prior Publication Data
US 2006/0282901 A1    Dec. 14, 2006

(51) Int. Cl.
*G06F 7/04* (2006.01)
(52) U.S. Cl. ...................................................... 726/26
(58) Field of Classification Search .................. 726/26; 713/165, 168
See application file for complete search history.

(56) References Cited

U.S. PATENT DOCUMENTS

| 5,659,614 | A | | 8/1997 | Bailey, III et al. |
| 5,751,813 | A | * | 5/1998 | Dorenbos ................... 713/153 |
| 6,128,735 | A | * | 10/2000 | Goldstein et al. ........... 713/166 |
| 2003/0120685 | A1 | | 6/2003 | Duncombe et al. |
| 2004/0039911 | A1 | * | 2/2004 | Oka et al. ................... 713/175 |
| 2004/0059913 | A1 | * | 3/2004 | de Jong ....................... 713/165 |

OTHER PUBLICATIONS

The Palm Store; "64MB Mobile Backup Card"; 2005 http://store.palmone.com/product/index.jsp?productID=1400312.
BlackBerry; "BlackBerry Enterprises Software v4.0 for Microsoft Exchange" Feature Enhancement Overview; 2004 Research In Motion Limited; www.blackberry.com.
BlackBerry; "BlackBerry Security" White Paper Release 4.0; 2004 Research In Motion Limited; www.blackberry.com.
BlackBerry; "BlackBerry Wireless Enterprise Activation" Release 4.0 Technical Overview; 2004 Research In Motion Limited; www.blackberry.com.
Herb Little; "The Use of Public Key Cryptography within BlackBerry"; Certicom ECC Conference 2004.
David Yach; "Research In Motion"; Nov. 16$^{th}$, 2004.
LockStream; "Catalyst DRM Service Platform" Architecture Overview; Version 1.0; Nov. 2003.
LockStream; "ServerSide Architecture"; 2003.

* cited by examiner

*Primary Examiner*—Matthew B Smithers
*Assistant Examiner*—Ali S Abyaneh
(74) *Attorney, Agent, or Firm*—Sylvia Chen; Paula N. Chavez

(57) ABSTRACT

Disclosed is a method, system and apparatus for transferring protected data having an authorizing entity's outer encryption layer and having a user-fixed inner encryption layer from a first electronic device having a first unique, unalterable identifier to a second electronic device having a second unique, unalterable identifier. A central unit includes a receiver configured to receive from the first electronic device protected data having an authorizing entity's first outer encryption layer corresponding to the first unique, unalterable identifier and having a user-fixed inner encryption layer; a processor configured to decrypt the authorizing entity's first outer encryption layer of the protected data; a processor configured to encrypt an authorizing entity's second outer encryption layer of the protected data corresponding to the second unique, unalterable identifier; and a transmitter configured to transmit protected data to the second electronic device.

24 Claims, 7 Drawing Sheets

SYSTEM AND METHOD FOR PROTECTED DATA TRANSFER

FIELD OF THE INVENTION

The invention relates in general to digital data backup.

BACKGROUND OF THE INVENTION

Handheld computing devices have become increasingly popular and now perform many tasks that were previously performed by personal computers. Moreover, many functions of handheld computing devices, such as Personal Digital Assistants (PDAs), are performed by cellular or mobile telephones (sometimes referred to as "smartphones"). As users entrust these electronic devices with their personal data, backup functions may protect a user against data loss, in the event of loss of the device or malfunction.

In the case of mobile electronic devices such as cellular telephones, backup data can be transferred wirelessly to, and also stored at, a remote location such as a server. However, backing up personal data on a remote server raises privacy concerns. Private data may include, for example, banking information in that, in some regions, banking can be carried out using mobile devices, such as cellular telephones. In addition to private data, backup data may include phone codes, configuration data and various applications running on a handset. In this way, if a handset malfunctions or crashes, downloading backed up data may restore a handset to its previous configuration and functionality.

Encryption provides a certain amount of security in transmitting and storing backup data. Each device may contain a key with which to encrypt backup data. However, when a device encrypts data with a key that is specific to the device, only that device may decrypt the data backed up by itself. If that device is lost, severely malfunctions or is destroyed, restoring backed up data may be difficult or impossible.

Additionally, when backup data contains phone codes, configuration data and various applications that run on a handset, some process may be desired to prevent propagation of the backup data from one device to another, unless the device is lost, severely malfunctions or is destroyed. These protective measures may be needed to ensure that the relevant usage rights are observed. For example, an expensive gaming software purchased by a user usually grants that user the right to use the software on a only single device. Similarly, a user should not be allowed to benefit from services that have not been paid for by using the scheme of backing up the phone codes and configuration data from one device and restoring them to another.

Thus, there is an opportunity to more securely transfer private data to protect a user against data loss. There is also an opportunity to appropriately transfer data such that the backup data is properly propagated and usage rights are complied with.

BRIEF DESCRIPTION OF THE DRAWINGS

The accompanying figures, wherein like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
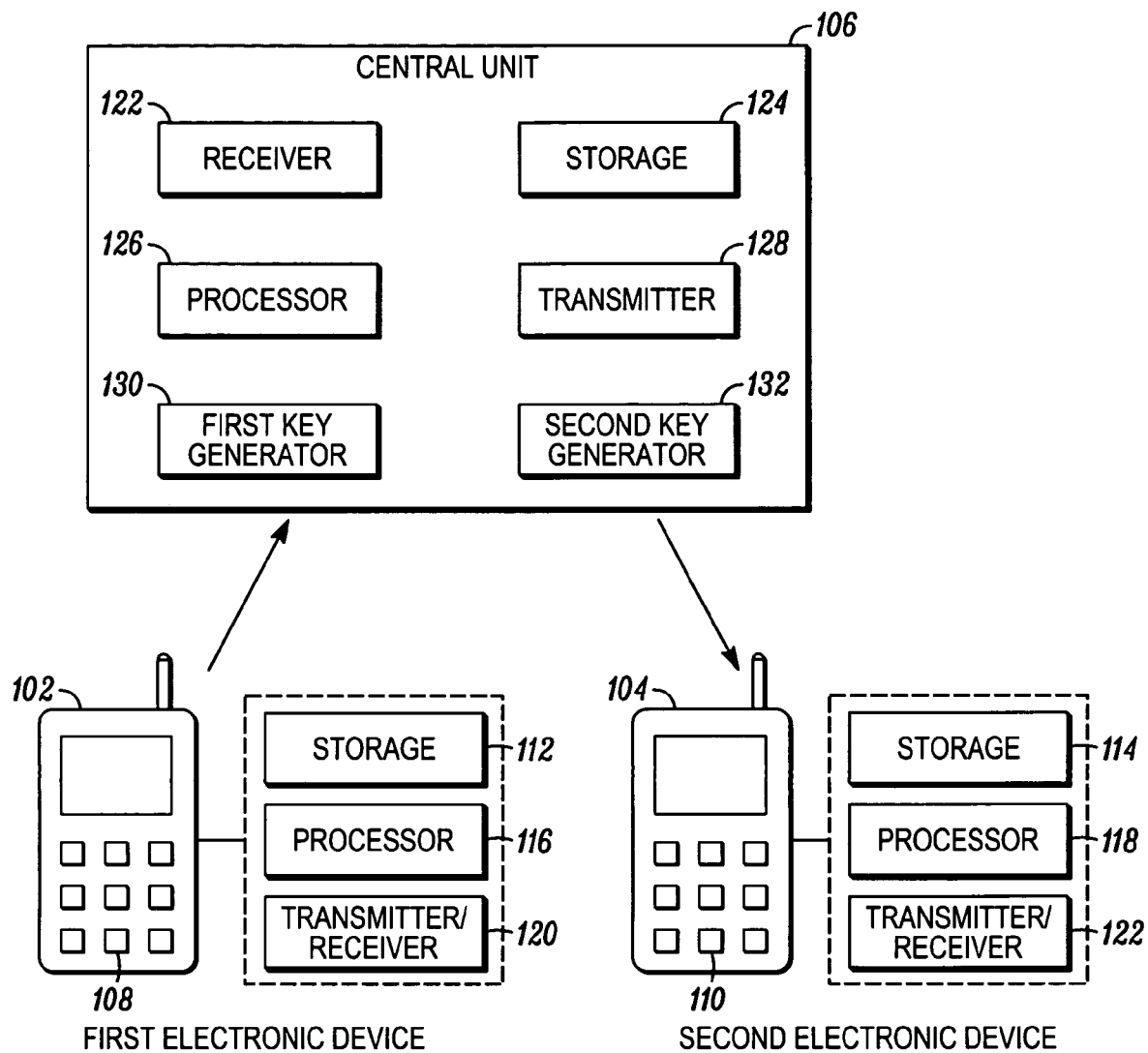
FIG. 1 depicts an embodiment of the system described herein, including a first electronic device, a second electronic device, and a central unit with encryption key generators.

Disclosed is a method, apparatus and system for transferring protected data. The protected data includes an authorizing entity's outer encryption layer and a user-fixed inner encryption layer. The terms "outer encryption layer" and "inner encryption layer" are provided for illustrative purposes. The terms provide a manner in which to visualize the encryption process, but they do not necessarily or particularly describe an architecture associated with the encryption.

Two or more electronic devices have different unique, unalterable identifiers and accordingly different encryption keys associated with them. The electronic devices, however, may operate with the same user-fixed encryption key. A user-fixed encryption key can be used to encrypt data to provide an inner user-fixed encryption layer in a first electronic device. The first electronic device includes a first unique, unalterable identifier and a corresponding first authorizing entity-shared key that can encrypt data to provide a first outer encryption layer. After data is encrypted with a user-fixed encryption key to form a user-fixed inner encryption layer, the first authorizing entity-shared encryption key encrypts that data with a first outer encryption layer. Since this outer encryption layer is generated using the authorizing entity-shared encryption key specific to the first device, the data thus encrypted cannot be properly decrypted by another device, unless it is done with the intervention of an authorizing entity as discussed below.

The data, once encrypted with the two layers, is protected data. There may be a number of ways to configure the protected data. Discussed below is one embodiment including a process that encrypts the data with a backup encryption key (BEK) and then that key is doubly encrypted as discussed immediately above. That is, in an exemplary embodiment, data is encrypted using a data encryption key (the BEK) wherein the data encryption key is encrypted with the authorizing entity's outer encryption layer and a user-fixed inner encryption layer. The protected data, in this case, includes both the encrypted data and the doubly encrypted data encryption key (BEK). This particular process is discussed with reference to FIGS. 5-7. In an alternative embodiment, the data itself may be doubly encrypted. In any embodiment, the protected data can be stored in various forms of media, which may be fixed, removable, and internal or external to the device.

A central unit serving as the authorizing entity may include a plurality of discrete devices that may be remote to one another. The term central unit is used for convenience for functions and devices that are not part of the electronic devices. Parts of the central unit may be divided into a plurality of parts, e.g., storage for different data may be in separate locations. A receiver of the central unit receives the protected data having a first outer encryption layer and having a user-fixed inner encryption layer from the first electronic device. The data may be stored by the central unit as backup data for the first electronic device. In the event that the protected data is transferred to a second electronic device, the central unit's processor decrypts the first outer encryption layer using an authorizing entity-shared encryption key corresponding to the unique, unalterable identifier of the first device, but does not and cannot decrypt the user-fixed inner encryption layer. The central unit encrypts the data still having the user-fixed inner encryption layer with a second outer encryption layer using a second authorizing entity-shared encryption key corresponding to the unique, unalterable identifier of the second device. In this way, the protected data including at least two layers of encryption may be transmitted to the second device. The user of the second device generates the same user-fixed key in the second device as in the first device. Therefore, the second device may decrypt the protected data using the second device's authorizing entity-shared encryption key and the user-fixed inner encryption key. The backup data may then be installed and processed by the second electronic device.

The instant disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

FIG. 1 depicts an embodiment of the system described herein, including a first electronic device, a second electronic device, and a central unit with encryption key generators. Turning now to FIG. 1, as mentioned above, even though the central unit 106 is shown as a single body in the figure, the central unit may, of course, include a plurality of discrete devices that are remote to one another. The depiction of the central unit 106 is for convenience of discussion.

FIG. 1 shows a first electronic device 102 and a second electronic device 104. The central unit 106 is depicted in communication with the first electronic device 102 and the second electronic device 104. The electronic devices 102 and 104 are generally equipped with input devices 108 and 110 that may be, for example, tactile or voice commanded, storage 112 and 114, processors 116 and 118, and transmitters and receivers 120 and 122. Although the electronic devices depicted are cellular telephones (also known as mobile phones or mobile stations), these devices may be any electronic devices that include communication functionality. Some of these devices include, for example, messaging devices, personal digital assistants (PDAs) with wireless connections, notebook or laptop computers incorporating communication modems, mobile data terminals, application specific gaming devices, video gaming devices incorporating wireless modems, and the like. It will be understood that both wireless and wired communication technology are contemplated herein. As semiconductor technology continues to improve, more communication and other features may be incorporated into increasingly smaller devices, and the backup data may include, for example phone codes, configuration data and various applications running on the electronic device, including the entire image of a device's internal memory, which could have booting capability. Furthermore, in the event of a device upgrade, the user can use the method, system and central unit as described herein to transfer data from one device to another, without the necessity of reentering the data or reinstalling applications.

The central unit 106, also known as the authorizing entity, generally includes a receiver 122, storage 124, a processor 126 and a transmitter 128. Storage 124 maintains the unique, unalterable identifiers of the first and second electronic devices 102 and 104 and can also maintain the authorizing entity-shared encryption keys corresponding to these identifiers if needed. The device manufacturer may assign the device's unique identifier, which is unalterable although it may be public. In the case that the manufacturer and the authorizing entity are not one and the same, the manufacturer communicates the device identifiers, and the authorizing entity-shared encryption keys corresponding to those identifiers if needed, for the devices it produced to the authorizing entity. Each unique identifier is stored on the processor 116, 118 of each electronic device 102, 104 in a secure manner such that, once assigned, it cannot be modified. The authorizing entity-shared encryption key (MK) is unique for each device, and may be correlated to the device's unique, unalterable identifier (ID). Furthermore, the MK may be stored in a persistent storage (e.g., flash memory) on the device and protected by a key encryption key (KEK) via encryption. The associated or corresponding KEK may be secured in the device using, for example, laser-etched fuses embedded within the processor such that external access is not allowed. The secure storage of the KEK could alternatively be implemented with other techniques known in the art. The authorizing entity retains knowledge of device IDs and corresponding MKs in either a direct or indirect manner, as will become apparent in the following description.

The backup storage may be managed by an authorizing entity. The authorizing entity may be the manufacturer of the device or may be another entity associated therewith. The central unit 106 includes first and second authorizing entity-shared encryption key generators 130 and 132. These encryption key generators are not required if the storage 124 maintains the authorizing entity-shared encryption keys corresponding to device identifiers.

Figure 2:
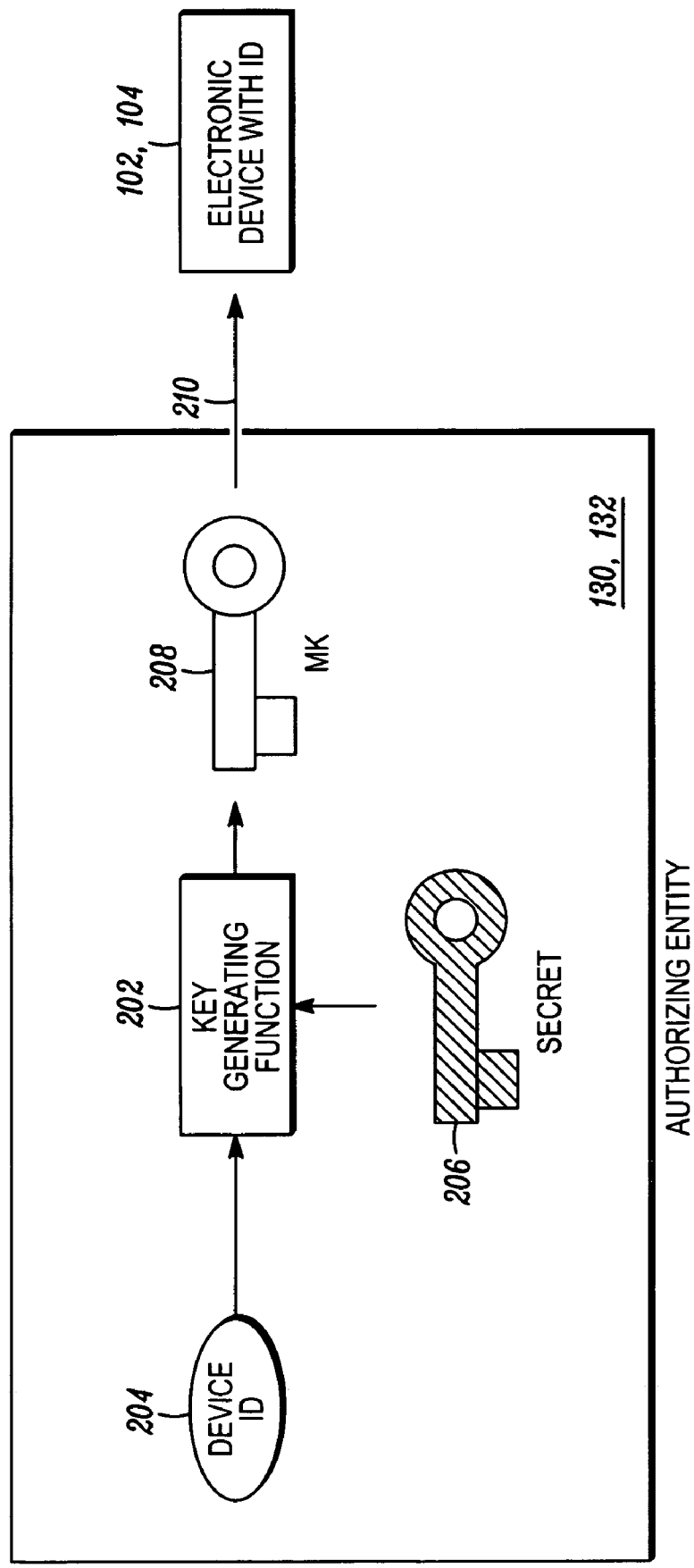
FIG. 2 is a diagram of an embodiment of a key generator of FIG. 1 in more detail.

FIG. 2 is a diagram of an embodiment of the key generators 130 and 132 of FIG. 1 in more detail. Each key generator 130, 132 includes a key generating function 202. The input to generate an authorizing entity-shared encryption key, or MK, includes the unique, unalterable ID 204 of an electronic device and a secret 206 of the authorizing entity, typically in the form of an encryption key. In the case that the manufacturer and the authorizing entity are not one and the same, the secret encryption key 206 may be shared by both. The secret encryption key 206 may require strong security for protection. The output from the key generating function 202 is a MK 208 corresponding to the particular device ID 204 used as input. This MK 208 can be either a symmetric encryption key, generated with the Advanced Encryption Standard (AES) or algorithms of the like as the key generating function 202, or an asymmetric encryption key pair, i.e., a key pair which has a public key and its corresponding private key, generated with RSA, elliptic curve, or algorithms of the like, as the key generating function 202. In the event that the MK 208 is an asymmetric encryption key pair, all encryption operations involving such keys are performed using the public component of the pair while all decryption operations involving such keys are performed using the private component of the pair. The key generators 130 and 132 in the central unit 106 (see FIG. 1) can be one and the same. Likewise, the secret encryption key 206 used in the key generators 130 and 132 can also be one and the same. In this way, only a single master key need be maintained by the authorization entity as the secret encryption key 206. Furthermore, the storage 124 in the central unit 106 may need to store only device IDs, or may even be eliminated, since MKs can be generated from IDs using the authorizing entity secret 206 via the key generating function 202 as needed.

In a different embodiment, MKs may be generated beforehand and individually paired with device IDs at random. The pair can be saved in storage 124 in the central unit 106 (see FIG. 1) to enable a MK to be recovered by looking up the corresponding device ID in the storage 124. Again, in addition to symmetric keys, the MKs can be asymmetric keys which have a public and a private component.

Returning to FIG. 2, the provisioning 210 of a MK to a device with the corresponding ID may be performed at the factory, e.g., prior to purchase, or it may be subsequently securely downloaded, for example, when a service for remote backup is engaged.

Figure 3:
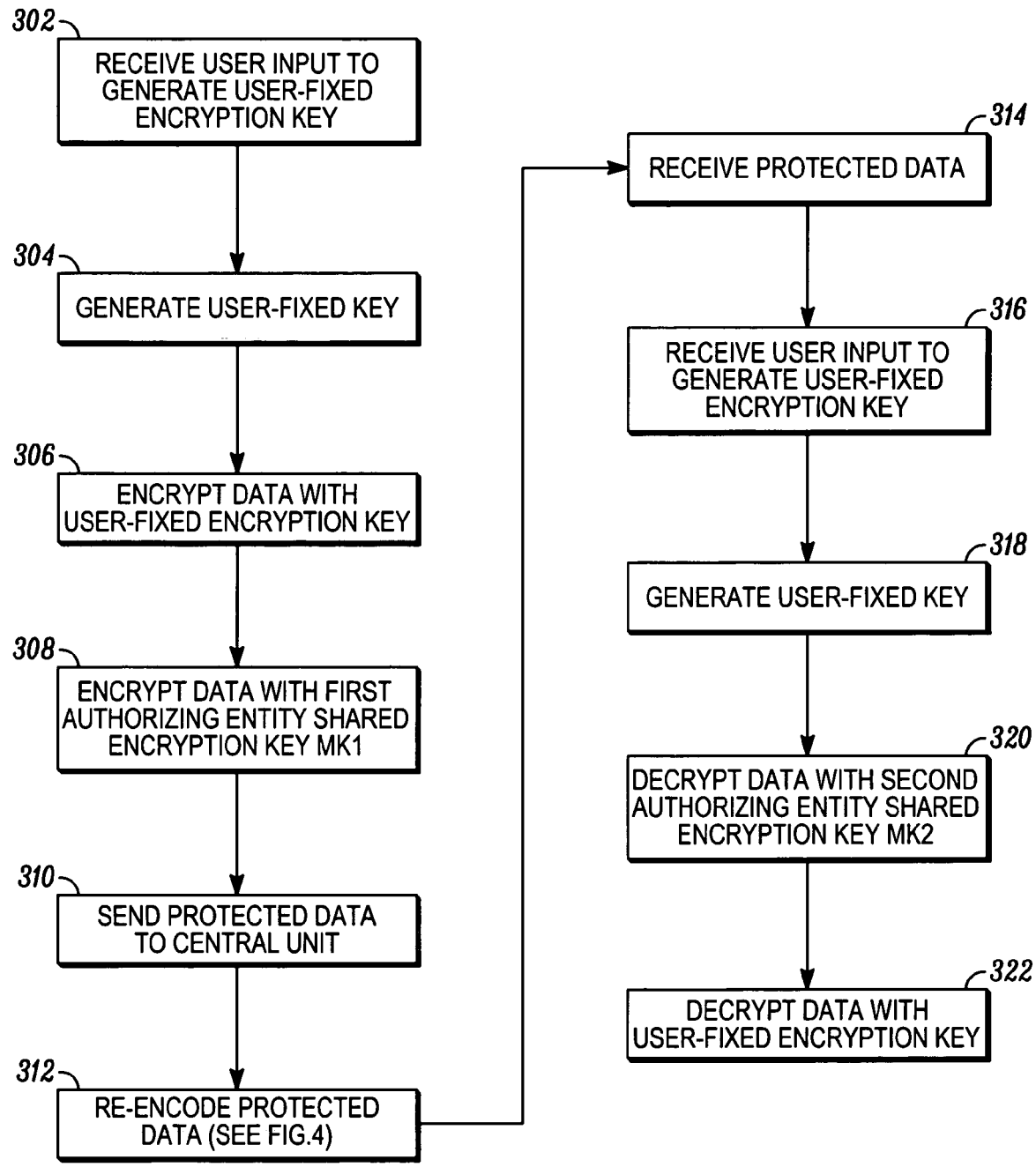
FIG. 3 is a flowchart of an embodiment of the process involving first and second electronic devices of FIG. 1.

FIG. 3 is a flowchart of an embodiment of the process involving first and second electronic devices 102 and 104 of FIG. 1. It will be understood, that while described with reference to two electronic devices, the method, apparatus and system are applicable to more than two devices as well. In the first electronic device 102, a user can provide input 302 to set up the user-fixed encryption key. The user-fixed encryption key is generated 304 to encrypt 306 data with a user-fixed inner encryption layer. The data is again encrypted 308, this time to form an outer layer of encryption, using a first authorizing entity-shared encryption key, MK1. The data having the two layers of encryption is referred to as protected data. The data recovery process by the first electronic device will also be described in more detail below.

To transfer protected data from one device to another, the user interacts with an authorizing entity also referred to as the central unit 106. As mentioned above, the authorizing entity can be, for example, the device manufacturer, the network provider, or some third-party provider. The user sends 310 to the authorization entity the protected data. The central unit processes 312 only the outer layer of encryption formed in step 308. The actual content of the protected data is not accessible to the authorizing entity since it is still encoded with the user-fixed encryption layer. The confidentiality of the user's data is, therefore, preserved. Of course, in other embodiments, other layers of encryption may be added. The outer encryption layer is decrypted by the central unit with the first authorizing entity-shared encryption key, MK1, corresponding to the unique, unalterable ID of the first device, and then re-encrypted with a second authorizing entity-shared encryption key, MK2, corresponding to the unique, unalterable ID of a second device. More detail of this process is provided in reference to FIG. 4.

Recovering the authorizing entity-shared encryption key, or MK, of a device based on its corresponding unique, alterable ID by the authorizing entity can be achieved in accordance with the procedure described in FIG. 2. Alternatively, the authorizing entity may maintain a database of a plurality of device ID and MK pairs in its storage unit 124, as mentioned above. The authorizing entity therefore has access to both MK1 and MK2.

In the event that the user having a second electronic device wishes to access the content of the protected data transmitted to the central unit in step 310 by the first electronic device 102, the second electronic device 104 can receive 314 the protected data. The user can set up 316 the user-fixed encryption key that is the same as that generated in the first electronic device 102 at step 304 by providing input. The outer encryption layer is decrypted 320 with MK2, the authorizing entity-shared encryption key corresponding to the unique, unalterable identifier of the second electronic device 104. The inner encryption layer is decrypted 322 using the encryption key generated at step 318 with user input.

Figure 4:
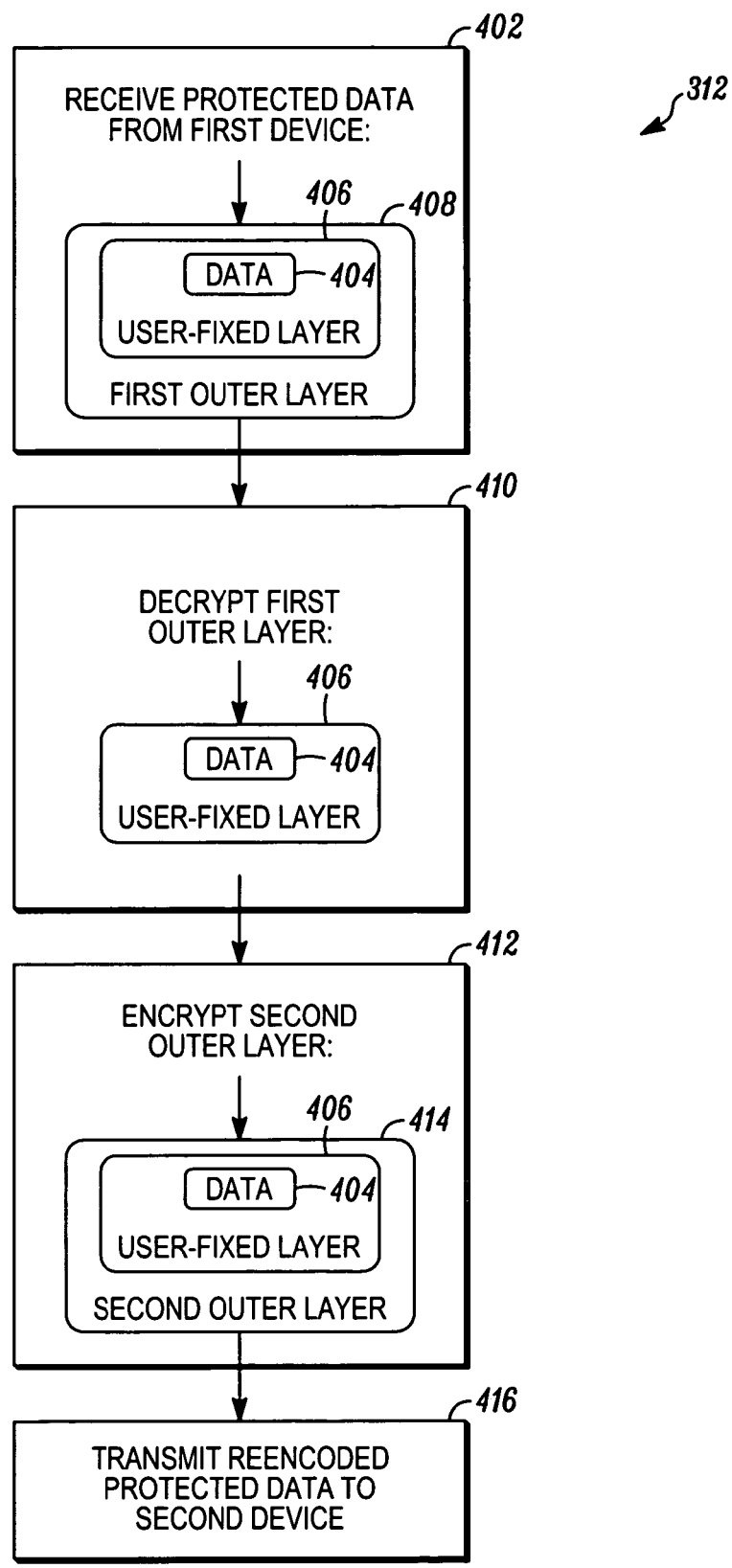
FIG. 4 is a data flow diagram that provides further detail of the process shown in FIG. 3.

FIG. 4 is a data flow diagram that provides further detail of the process shown in step 312 of FIG. 3. Now referring to FIG. 4, the protected data from the first electronic device 102 is re-encoded to the second electronic device 104 without compromising the privacy of the user. As previously discussed, the central unit 106 may strip the first outer encryption layer and apply a second outer encryption layer operable by the second electronic device without having the ability to fully decrypt the content. The central unit 106 receives 402 the protected data from the first electronic device 102. The protected data has data 404 protected by an inner user-fixed encryption layer 406 and a first outer encryption layer 408. Herein, the term "protected data" is used to refer to, for example, doubly wrapped, encrypted or layered data. The central unit 106 can decrypt 410 the first outer encryption layer 408 using the MK of the first device, MK1, but the data 404 remains encrypted by the user-fixed inner encryption layer 406. As described with reference to FIG. 3, in the event that the user or an authorized agent of the user wishes to allow the second electronic device 104 to access the data 404, the central unit 106 may wrap the data 404 still encrypted with the user-fixed inner encryption layer 406 in a second outer encryption layer 414 by performing an encryption 412 using the MK of the second device, MK2. The central unit 106 can transmit 416 to the second electronic device 104 the re-encoded protected data.

Figure 5:
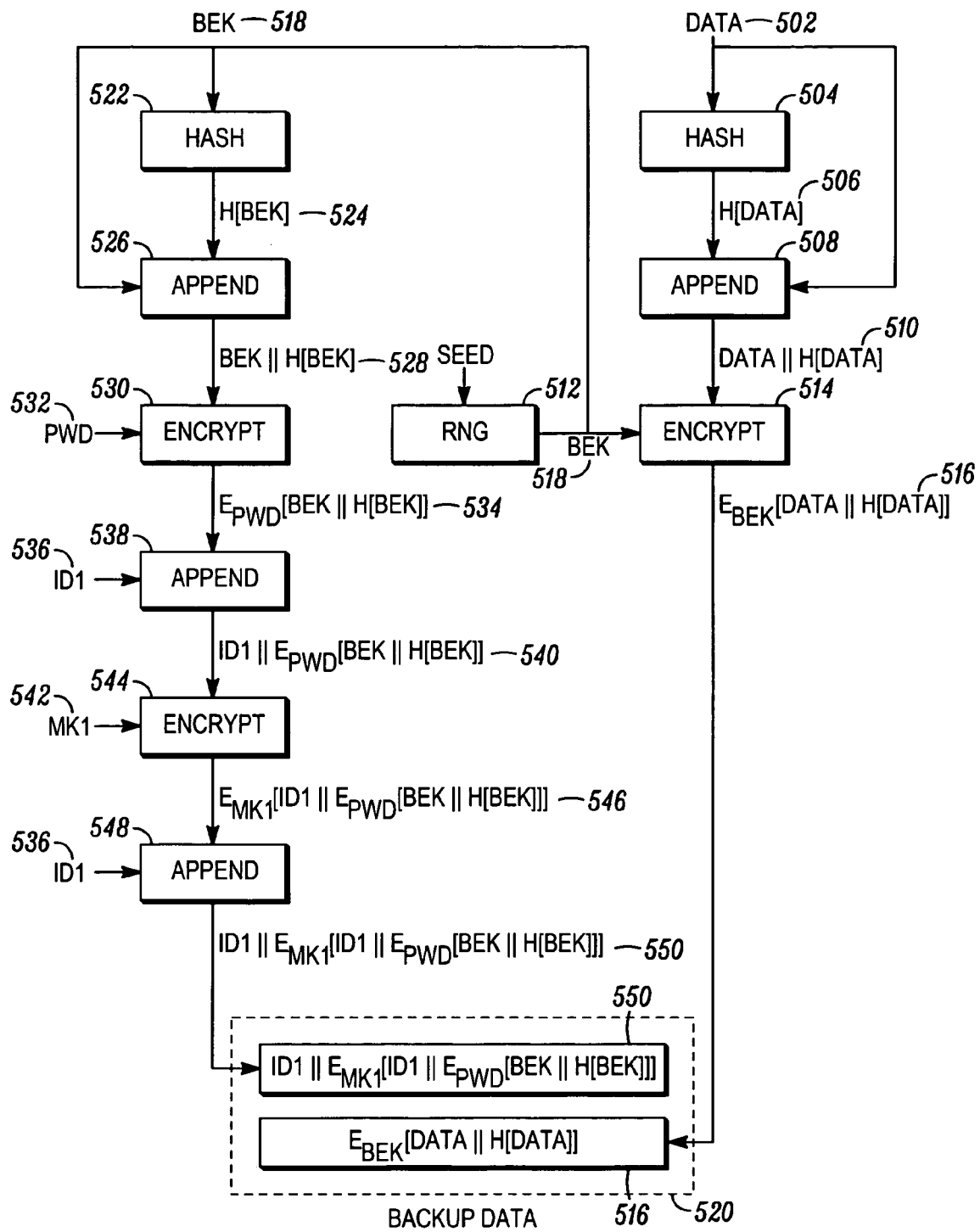
FIG. 5 is a data flow diagram showing details of a secure backup process according to the embodiment of FIG. 1.
Figure 6:
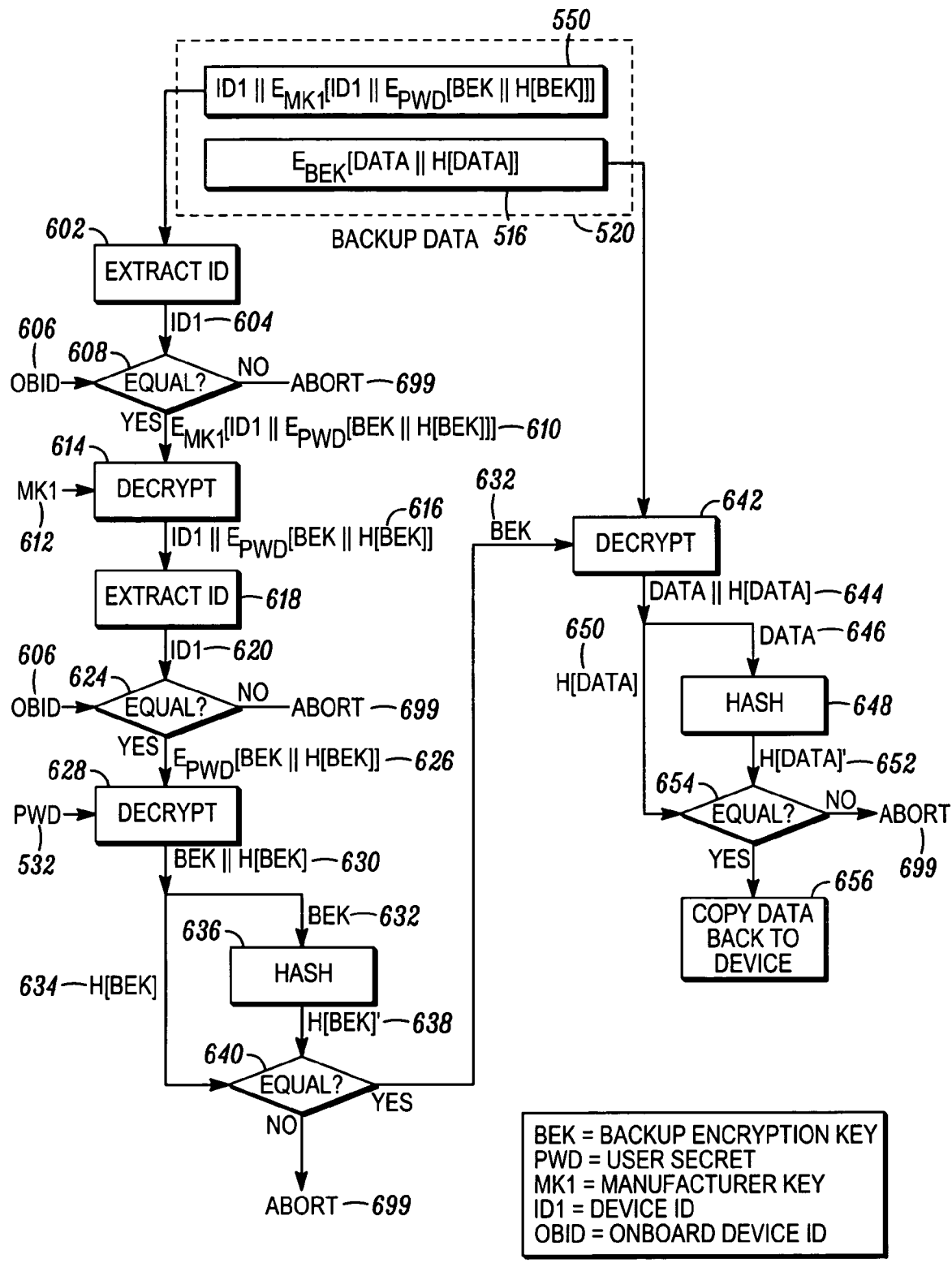
FIG. 6 is a data flow diagram showing details of a secure restore process according to the embodiment of FIG. 1.
Figure 7:
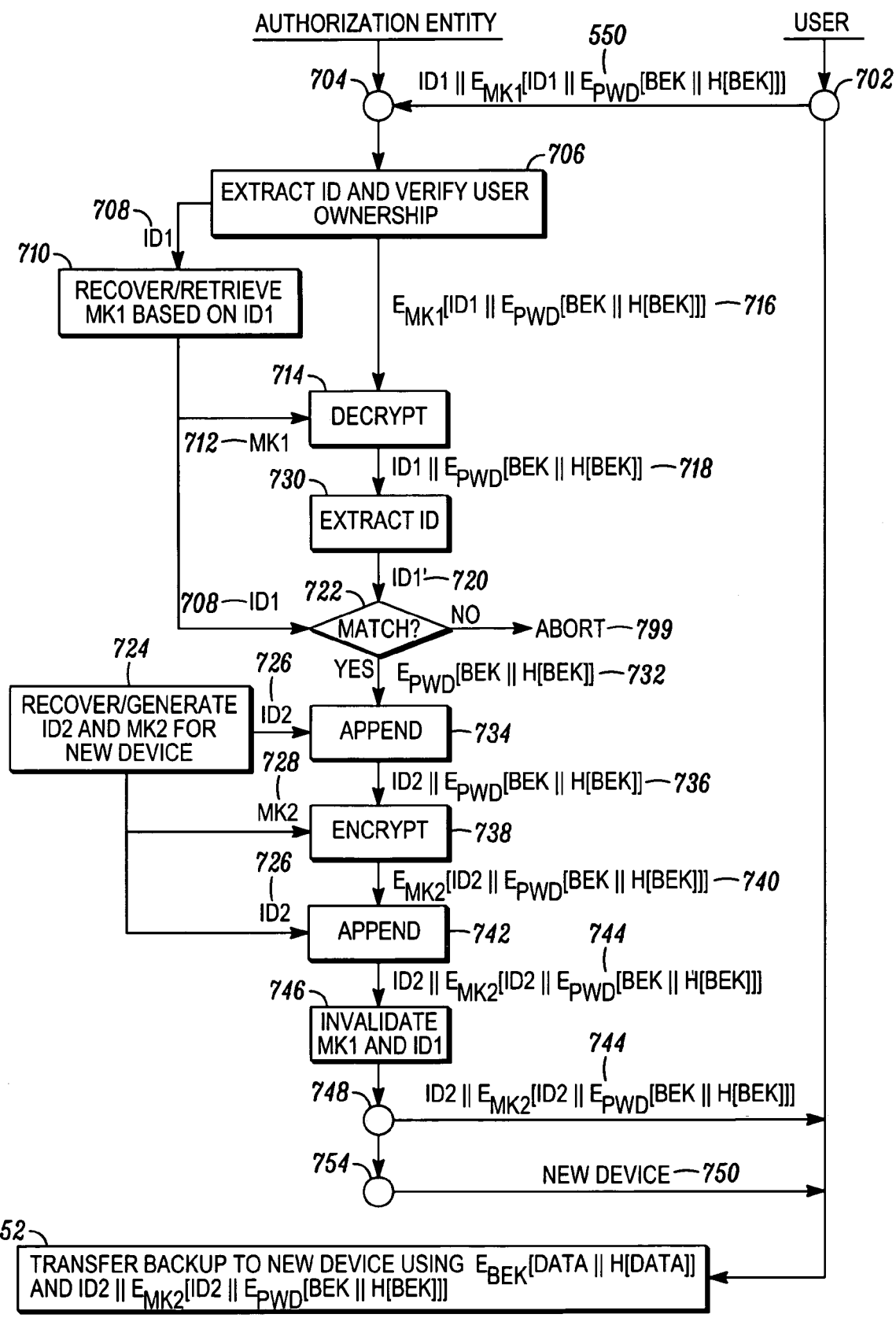
FIG. 7 is a diagram showing details of a secure backup transfer and re-encoding of a key object according to the embodiment of FIG. 1.

Now turning to FIGS. 5-7, a more detailed discussion of processes by which the data is securely backed up and restored is provided. While details are provided herein for processing and security, other processes and methods maybe utilized to perform generation of the keys, encryption of the two layers and their decryption. The process described below is an illustrative embodiment of the manner in which to perform secure transfer of protected data.

FIG. 5 is an exemplary data flow diagram showing details of a secure backup process for protected data transfer according to the embodiment of FIG. 1. Now referring to FIG. 5, the details of the secure backup process are described. It is assumed that the user's electronic device has a built-in trusted backup and restore application. The word "trusted" here conveys certain notions of security, such as tamper detection and/or prevention, that are apparent to those of ordinary skill in the art.

The user may specify data 502 to be backed up. As discussed above, data 502 may include software applications to be backed up, as well as personal data and/or application data, email or other text messages, and other forms of data a user may wish to securely back up. A message digest or hash function 504 may be provided as a part of the trusted backup and restore application. The hash function transforms 504 the data 502 into a message digest, denoted as H[data] 506 in FIG. 5. Hashing may provide data integrity verification, and for this purpose the hashed data 506 is appended 508 to data 502, the result of the appending denoted as data||H[data] 510. In all of the appending operations described herein and hereafter, the order from that which is described in which the objects are concatenated may be changed just as other operations may be varied from that which is described to carry out the described system and method. Therefore, the resultant object data||H[data] 510 may as well be denoted as H[data]||data, with the understanding that both may be equivalent, and that they may refer to the same object.

A random number generator (RNG) 512 provides a backup encryption key BEK 518 to encrypt 514 object 510, giving an encoded object $E_{BEK}$[data||H[data]] 516. Encoded object 516 may also be referred to herein as the "body" 516 of the backup data 520.

A hash function transformation 522 provides integrity verification of BEK 518. The result 524 of the hash transformation is denoted H[BEK]. H[BEK] 524 may be appended 526 to BEK 518 to provide a result denoted BEK||H[BEK] 528.

The object BEK||H[BEK] 528 is encrypted 530 using a user secret PWD 532, typically in the form of a key, derived from user input, such as a password, to protect the user's privacy. The PWD 532 need not be generated each time data backup processing is performed. It may be derived once based on a user secret and stored in the device's persistent memory. For protection, PWD 532 may be encrypted using the KEK in the device, as mentioned previously. However, generating a new PWD from a different user secret for each backup offers additional privacy protection, since in that situation the compromise of PWD used in one backup does not compromise the PWD used in another. A disadvantage of using different PWDs for different backups is that the user is burdened with the task of memorizing which secret is associated with which backup. Certain easily remembered algorithms may be used to define passwords and therefore enable easy recollection. Alternatively, PWD 532 may be derived from user input that is in the form of biometric data. The result of the encryption 530 is denoted $E_{PWD}$[BEK||H[BEK]] 534.

To enable a quick check on the validity of the device ID, ID1, 536 during restore or transfer, the result 534 may be appended 538 to a copy of ID1 536, the result being denoted ID1||$E_{PWD}$[BEK||H[BEK]] 540. This may be useful in detecting "substitution" or "spoofing" attacks, where an adversary may attempt to modify another copy of ID1 536 that is appended to the result of object 540 subjected to further processing.

The object ID1||$E_{PWD}$[BEK||H[BEK]] 540 may be encrypted 544 using a first authorizing entity-shared encryption key MK1 542, which corresponds to ID1 536, to provide access control, with result denoted $E_{MK1}$[ID1||$E_{PWD}$[BEK||H[BEK]]] 546. Result 546 may be appended to a copy of ID1 536, yielding ID1||$E_{MK1}$[ID1||$E_{PWD}$[BEK||H[BEK]]] 550. This last copy of ID1 536 is in the clear, which allows the authorizing entity to extract it and retrieve or regenerate MK1 542. At the same time, however, this ID field is open to substitution or modification by an adversary, as mentioned previously. That is why the same ID may also be wrapped within the outer encryption layer 544 based on MK1 542 as described above, so that the restore application or the authorizing entity can quickly check whether ID1 536 has been modified, either intentionally or unintentionally, by comparing the unencrypted ID1 536 in object 550 against that decrypted from $E_{MK1}$[ID1||$E_{PWD}$[BEK||H[BEK]]] 546 during backup restore or transfer. The result 550, is referred to as the "key object".

It can be seen that the resultant backup data 520 actually is made of two parts, which are denoted herein as the "key object" 550 and the "body" 516. The two parts can be physically separate, e.g., in the form of two files, or, they can be logical partitions within a single object, e.g., a file, that is distinguishable to the proper processing application.

Upon completion, the protected data 520 can be stored in any desired form and location, which include but are not limited to: magnetic, optical, and solid state internal or removable storage media; remote data storage servers; and personal computer hard drives. The backup and restore system and method disclosed herein is independent of the storage location and method since it already accounts for data integrity, authentication, and confidentiality.

FIG. 6 is a data flow diagram showing details of a secure restore process according to the embodiment of FIG. 1. Turning now to FIG. 6, details of the secure restore process are described. In the discussion of FIG. 6, restoration to the same electronic device is assumed. Transfer of backup data to a different device is discussed below in connection with FIG. 7.

The user may initiate the restore procedure of FIG. 6 by launching the backup and restore application. Certain setups may be utilized to assist the user with the process. For example, if the backup were stored on the hard drive of a personal computer (PC), the handset device could be inserted into a cradle that is connected to the PC, and the restore application would interact with the user through the computer screen, providing a better user experience.

The application first retrieves the two portions 550 and 516 of backup data 520, which may come from various storage media as mentioned above. The restore application then processes the backup data as follows.

At a step 602, a device ID, ID1 604, is extracted from key object ID1||$E_{MK1}$[ID1||$E_{PWD}$[BEK||H[BEK]]] 550 and compared 608 against the onboard ID of the device, OBID 606. The backup process aborts 699 if ID1 604 and OBID 606 fail to match. The two IDs may differ as a result of the unencrypted ID in the key object 550 having been intentionally or unintentionally modified. It may also be possible that the key object 550 did not originate from the device under consideration. Otherwise, the remainder $E_{MK1}$[ID1||$E_{PWD}$[BEK||H[BEK]]] 610 of key object 550 is extracted.

To remove the outer layer of encryption based on the authorizing entity-shared encryption key, MK1 612 is used to decrypt 614 the object $E_{MK1}$[ID1||$E_{PWD}$[BEK||H[BEK]]] 610 to produce the result ID1||$E_{PWD}$[BEK||H[BEK]] 616. ID1 620 may be extracted 618 from this result 616 and compared 624 with OBID 606. The process aborts 699 if ID1 620 and OBID 606 disagree. The two values 620 and 606 may be different as a result of intentional or unintentional modification of the ID1 604 recovered from step 602. Otherwise, ID1 620 is removed, leaving $E_{PWD}$[BEK||H[BEK]] 626.

To remove the inner layer of encryption based on user secret, the result $E_{PWD}$[BEK||H[BEK]] 626 is decrypted 628 using the key PWD 532 that is derived from a user-provided secret, as mentioned previously in connection with FIG. 5. The result is denoted as BEK||H[BEK] 630.

In order to verify the integrity of BEK in BEK||H[BEK] 630, BEK 632 is extracted and then a hashing function may be applied 636 to BEK 632 and the result 638 compared 640 with H[BEK] 634 extracted from BEK||H[BEK] 630. The process aborts 699 if the two hash values disagree according to the comparison 640.

Using BEK 632 just recovered, the body 516 of the backup data 520 is decrypted 642, resulting in data||H[data] 644. Then, in order to verify the integrity of the data in data||H[data] 644, data 646 is extracted and a hashing function applied 648. If a comparison 654 of result 652 shows disagreement with H[data] 650 extracted from data||H[data] 644, the process aborts 699. Otherwise, data 646 is restored 656 to the device, and the process is complete.

FIG. 7 is a diagram showing details of a secure backup transfer and re-encoding of a key object according to the embodiment of FIG. 1. Turning now to FIG. 7, a transfer of backup data 520 between devices is described. It is envisioned that the need to transfer backup data from one device to another is relatively rare. Typically, there may be two scenarios that warrant the transfer procedure. One scenario is where a device has been lost or severely damaged. The other is where a user has upgraded his device, and he would like to use the software purchased for the older device to run on the newer one. This scenario assumes that the software is compatible across the different device platforms. However, with software developed in platform-independent languages such as Java, this may not be an issue.

As discussed above, certain setups could be utilized to assist the user with the transfer process. For example, a PC application dedicated to the backup transfer operation could be provided as part of the software that comes with the purchase of the device. When the old device is lost or damaged, this application could be used to retrieve the key object portion from the backup, e.g., from the PC hard drive, a solid state memory card, or other backup media, and send it to the authorizing entity, e.g., via an Internet connection. Another way may be for the user to bring in the backup to a service center and have the service representative interact with the authorizing entity in transferring the backup data and re-encoding the key object. Alternatively, the service center may have kiosks that allow users to insert their storage media (solid state memory cards, CDs, or other storage media) and then communicate with the authorizing entity on a remote server.

Referring now to FIG. 7, the process of transferring the backup data and re-encoding the key object proceeds as follows.

The user may provide 702 a key object 550 to an authorizing entity. Upon receiving 704 the key object ID1||$E_{MK1}$[ID1||$E_{PWD}$[BEK||H[BEK]]] 550, the authorizing entity may extract 706 from it the device ID, ID1 708. The authorizing entity may also verify user ownership at step 706, for example, through product registration information.

Using ID1 708 and the authorizing entity's secret key 206 as inputs to the key generation function 202 (see FIG. 2), the authorizing entity may recover 710 the authorizing entity-shared encryption key MK1 712 corresponding to ID1 708. Alternatively, MK1 712 may be obtained from the authorizing entity's storage unit 124 (see FIG. 1), if one is present, by looking up the corresponding device ID, ID1 708.

With MK1 712, the authorizing entity removes the first outer layer of encryption by decrypting 714 the remainder of the key object, $E_{MK1}$[ID1||$E_{PWD}$[BEK||H[BEK]]] 716, with result ID1||$E_{PWD}$[BEK||H[BEK]] 718.

The authorizing entity extracts 730 the ID portion 720 from the above result 718, and compares 722 it against the device ID 708 obtained in step 706. If the two IDs fail to match, the process aborts 799. The failure to match may, for example, result from an adversary's attempt to substitute an invalid ID in the key object. It may also be possible that ID1 708 has been unintentionally modified, e.g., due to transmission error.

In a step 724, the authorizing entity may obtain the device ID, ID2, 726 from a new device (for example, the user's upgrade), and recover the-authorizing entity-shared encryption key MK2 728 corresponding to ID2 726, just as was done in step 710 above. Alternatively, the authorizing entity may generate a new ID2 726, along with a corresponding MK2 728, and provision them to a virgin device for a replacement unit 750.

A quick check on validity of the device ID, ID2 726, during restore, may be enabled. ID2 726 may be appended 734 to the object $E_{PWD}$[BEK||H[BEK] 732 that remains from step 730 in which the ID portion has been extracted, the result denoted ID2||$E_{PWD}$[BEK||H[BEK]] 736. This result 736 may be wrapped in a second layer of outer encryption 738 using the authorizing entity-shared encryption key MK2 728, the result denoted $E_{MK2}$[ID2||$E_{PWD}$[BEK||H[BEK]]] 740.

A second copy of ID2 726 may be appended 742 to the result $E_{MK2}$[ID2||$E_{PWD}$[BEK||H[BEK]]] 740 to form ID2||$E_{MK2}$[ID2||$E_{PWD}$[BEK||H[BEK]]] 744, which is the re-encoded key object for the new device. This copy of ID2 726 is in the clear, i.e., not encrypted, which may allow the authorizing entity to extract it and recover MK2 728 when necessary.

At this point, the authorizing entity may also add ID1 708 to a "revocation" or "watch" list, or remove it from the central storage unit 124, at step 746. Additional requests in the future to re-encode the same key object 550 having ID1 708 may be considered a sign of fraudulent activity, e.g., a user trying to propagate the same backup data to multiple devices. The authorizing entity may choose not to honor these requests.

Finally, the authorizing entity may send 748 the new key object ID2||$E_{MK2}$[ID2||$E_{PWD}$[BEK||H[BEK]]] 744, and also send 754 a replacement unit 750 having ID2 726, if needed, to the user, completing the transferring/re-encoding process.

Finally, on the new device, a restoration 752 of the backup data may be carried out by the user. This process is nearly identical to the process described in FIG. 6, the only differences being the substitution of ID2 and MK2 for ID1 and MK1, respectively.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method for transferring protected data having an authorizing entity's outer encryption layer and having a user-fixed inner encryption layer from a first electronic device having a first unique, unalterable identifier to a second electronic device having a second unique, unalterable identifier, the method comprising:

receiving protected data having a first unique, unalterable identifier of the first electronic device, a first outer encryption layer, and the user-fixed inner encryption layer from the first electronic device, wherein data having the user-fixed inner encryption layer is generated by encrypting data using a first user-fixed encryption key, the first user-fixed encryption key being generated from a first user input received at the first electronic device, wherein the first outer encryption layer is generated by encrypting the data having the user-fixed encryption layer using a first authorizing entity-shared encryption key corresponding to the first unique, unalterable identifier of the first electronic device;

verifying the first unique, unalterable identifier of the first electronic device;

generating, in response to the verification, the data having the user-fixed inner encryption layer by decrypting the first outer encryption layer using a first authorizing entity-shared encryption key corresponding to the first unique, unalterable identifier of the first electronic device;

encrypting the data having the user-fixed inner encryption layer with a second outer encryption layer using a second authorizing entity-shared encryption key corresponding to the second unique, unalterable identifier of the second electronic device;

appending, in response to the encryption, a second unique, unalterable identifier of the second electronic device; and transmitting the protected data having the second unique, unalterable identifier of the second electronic device, the second outer encryption layer, and the user-fixed inner encryption layer to the second electronic device, wherein the second electronic device decrypts the protected data using the second authorizing entity-shared encryption key corresponding to the second unique, unalterable identifier to form the data having the user-fixed inner encryption layer, and decrypts the data having the user-fixed inner encryption layer using the first user-fixed encryption key generated from a second user input received at the second electronic device.

2. The method of claim 1, further comprising:

encrypting the user-fixed inner encryption layer with a user-fixed encryption key; and decrypting the user-fixed inner encryption layer with the user-fixed encryption key.

3. A method as recited in claim 1 wherein the first electronic device and the second electronic device are one and the same.

4. A method as recited in claim 1 wherein the first authorizing entity-shared encryption key corresponding to the first unique, unalterable identifier of the first electronic device is generated, the method further comprising:

inputting the first unique, unalterable identifier of the first electronic device and a first secret encryption key of the authorizing entity; and outputting the first authorizing entity-shared encryption key.

5. A method as recited in claim 1 wherein the second authorizing entity-shared encryption key corresponding to the second unique, unalterable identifier of the second electronic device is generated, the method further comprising:

inputting the second unique, unalterable identifier of the second electronic device and a second secret encryption key of the authorizing entity; and outputting the second authorizing entity-shared encryption key.

6. A method as recited in claim 1 wherein generating the protected data comprises:

encrypting data using a data encryption key wherein the data encryption key is encrypted with the authorizing entity's outer encryption layer and a user-fixed inner encryption layer.

7. A method as recited in claim 1 wherein an authorizing entity-shared encryption key is a symmetric key.

8. A method as recited in claim 1 wherein an authorizing entity-shared encryption key is an asymmetric key having a public component and a private component.

9. A method as recited in claim 1 wherein the protected data having an authorizing entity's outer encryption layer and having a user-fixed inner encryption layer is generated from backup data.

10. A central unit configured to be in communication with a first electronic device having a first unique, unalterable identifier and a second electronic device having a second unique, unalterable identifier, the central unit comprising:

a receiver configured to receive from the first electronic device, protected data having a first unique, unalterable identifier of the first electronic device, an authorizing entity's first outer encryption layer corresponding to the first unique, unalterable identifier, and a user-fixed inner encryption layer formed from a first user-fixed encryption key generated from a first user input at the first electronic device;

a processor configured to verify the first unique, unalterable identifier of the first electronic device and to decrypt the authorizing entity's first outer encryption layer of the protected data in response to the verification;

a processor configured to encrypt an authorizing entity's second outer encryption layer of the protected data corresponding to the second unique, unalterable identifier and to append, in response to the encryption, a second unique, unalterable identifier of the second electronic device; and a transmitter configured to transmit to the second electronic device, the protected data having the second unique, unalterable identifier of the second device, authorizing entity's second outer encryption layer, and the user-fixed inner encryption layer for decryption at the second electronic device using the first user-fixed encryption key formed from a second user input received at the second electronic device and the second authorizing entity-shared encryption key corresponding to the second unique, unalterable identifier.

11. The central unit as recited in claim 10, further comprising:

a database configured to store a first authorizing entity-shared encryption key for decrypting the authorizing entity's first outer encryption layer of the protected data encrypted by the first electronic device.

12. The central unit as recited in claim 10, further comprising:

a database configured to store a second authorizing entity-shared encryption key for encrypting the second outer encryption layer of the protected data to be decrypted by the second electronic device.

13. The central unit as recited in claim 10, further comprising:

a key generation module configured to generate the first authorizing entity-shared encryption key corresponding to the first unique, unalterable identifier of the first electronic device.

14. The central unit as recited in claim 10, further comprising:

a key generation module configured to generate the second authorizing entity-shared encryption key corresponding to the second unique, unalterable identifier of the second electronic device.

15. The central unit as recited in claim 10 wherein the protected data having an authorizing entity's outer encryption layer and having a user-fixed inner encryption layer is generated from backup data.

16. The central unit as recited in claim 10 wherein the protected data comprises data encrypted using a data encryption key and the data encryption key encrypted with an authorizing entity's outer encryption layer and a user-fixed inner encryption layer.

17. The central unit as recited in claim 10 wherein the central unit is a remote server.

18. A system comprising:
a first electronic device having a first unique, unalterable identifier and a first corresponding encryption key for encrypting a first outer encryption layer of protected data, the first electronic device comprising:
an input device for receiving user input to generate a user-fixed encryption key to encrypt a user-fixed inner encryption layer of data;
a processor for encrypting the user-fixed inner encryption layer of data, encrypting the first outer encryption layer of the encrypted user-fixed inner encryption layer of data, and appending the first unique, unalterable identifier of the first electronics device to the encrypted first outer encryption layer; and
a transmitter for transmitting the protected data having the first unique, unalterable identifier of the first electronic device, the first outer encryption layer, and the user-fixed inner encryption layer;
a central unit comprising:
a storage unit for storing the first corresponding encryption key and a second corresponding encryption key;
a receiver for receiving the protected data having first unique, unalterable identifier of the first electronics device, the first outer encryption layer, and the user-fixed inner encryption layer;
a processor for verifying the first unique, unalterable identifier of the first electronic device, decrypting in response to the verification the first outer encryption layer of the protected data with the first corresponding encryption key, for encrypting a second outer encryption layer of the protected data with the second corresponding encryption key, and appending the second unique, unalterable identifier of the second electronic device to the encrypted second outer encryption layer of the protected data; and
a transmitter for transmitting the protected data having the second unique, unalterable identifier of the second electronic device, the second outer encryption layer, and the user-fixed inner encryption layer; and
a second electronic device having a second unique, unalterable identifier and the second corresponding encryption key for decrypting the second outer encryption layer of the protected data, comprising:
an input device for receiving user input to generate the user-fixed encryption key to decrypt the user-fixed inner encryption layer of the protected data;
a receiver for receiving the protected data having the second unique, unalterable identifier of the second electronic device, the second outer encryption layer, and the user-fixed inner encryption layer; and
a processor for verifying the second unique, unalterable identifier of the second electronic device, decrypting in response to the comparison the second outer encryption layer, and decrypting the user-fixed inner encryption layer of the protected data.

19. A system as recited in claim 18 wherein the first electronic device further comprises:
a storage device for storing data to be protected, the first corresponding encryption key and the user-fixed encryption key.

20. A system as recited in claim 18 wherein the second electronic device further comprises:
a storage device for storing the protected data, the second corresponding encryption key and the user-fixed encryption key.

21. The system as recited in claim 18 wherein the first corresponding encryption key, the user-fixed encryption key and the second corresponding encryption key are symmetric keys.

22. The system as recited in claim 18 wherein the user-fixed encryption key is a symmetric key, and the first corresponding encryption key and the second corresponding encryption key are asymmetric keys comprising a public component and a private component.

23. The system as recited in claim 18 wherein the protected data comprises data encrypted using a data encryption key and the data encryption key encrypted with an outer encryption layer and a user-fixed inner encryption layer.

24. The system as recited in claim 18, further comprising:
a first key generation module configured to generate the first corresponding encryption key corresponding to the first unique, unalterable identifier; and
a second key generation module configured to generate the second corresponding encryption key corresponding to the second unique, unalterable identifier.

* * * * *